US009432305B1

(12) United States Patent
Das et al.

(10) Patent No.: US 9,432,305 B1
(45) Date of Patent: Aug. 30, 2016

(54) CONNECTION REDISTRIBUTION IN LOAD-BALANCED SYSTEMS

(71) Applicant: Amazon Technologies, Inc., Reno, NV (US)

(72) Inventors: Pejus Manoj Das, Shoreline, WA (US); David Craig Yanacek, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 680 days.

(21) Appl. No.: 13/927,851

(22) Filed: Jun. 26, 2013

(51) Int. Cl.
*G06F 15/16* (2006.01)
*H04L 12/923* (2013.01)

(52) U.S. Cl.
CPC .................... *H04L 47/762* (2013.01)

(58) Field of Classification Search
CPC ....................................... H04L 47/762
USPC ............................................. 709/226
See application file for complete search history.

(56) References Cited

U.S. PATENT DOCUMENTS

| 6,185,601 | B1 | 2/2001 | Wolff | |
| 7,287,082 | B1* | 10/2007 | O'Toole, Jr. | H04L 67/1008 709/223 |
| 2002/0120743 | A1* | 8/2002 | Shabtay | H04L 67/1008 709/226 |
| 2009/0240705 | A1 | 9/2009 | Miloushev et al. | |
| 2010/0036903 | A1 | 2/2010 | Ahmad et al. | |
| 2011/0208875 | A1* | 8/2011 | Hasson | G06F 1/3203 709/238 |
| 2012/0246637 | A1 | 9/2012 | Kreeger et al. | |

OTHER PUBLICATIONS

U.S. Appl. No. 13/864,162, filed Apr. 16, 2013, James Christopher Sorenson, III et al.
U.S. Appl. No. 13/864,157, filed Apr. 16, 2013, James Christopher Sorenson, III et al.
U.S. Appl. No. 13/864,152, filed Apr. 16, 2013, James Christopher Sorenson, III et al.
U.S. Appl. No. 13/864,148, filed Apr. 16, 2013, James Christopher Sorenson, III et al.
U.S. Appl. No. 13/864,145, filed Apr. 16, 2013, James Christopher Sorenson, III et al.
U.S. Appl. No. 13/864,138, filed Apr. 16, 2013, James Christopher Sorenson, III et al.
U.S. Appl. No. 13/864,167, filed Apr. 16, 2013, James Christopher Sorenson, III et al.

(Continued)

*Primary Examiner* — Bryan Lee
(74) *Attorney, Agent, or Firm* — Robert C. Kowert; Meyertons, Hood, Kivlin, Kowert & Goetzel, P.C.

(57) ABSTRACT

Methods and apparatus for connection redistribution in load-balanced systems that include multiple load balancers each serving multiple nodes. In the connection redistribution method, each node estimates a connection close rate, which may be based on an estimation of the percentage of the overall client traffic received by the respective load balancer that is being handled by the node. The node generates close requests for connections between the respective load balancer and clients according to the connection close rate. The node sends the close requests to its load balancer, which forwards the close requests to the appropriate clients. Upon receiving a close request, a client may close the connection(s) indicated by the request, obtain a public IP address for a load balancer, and initiate new connection(s) to the respective load balancer via the public IP address.

20 Claims, 8 Drawing Sheets

(56) References Cited

OTHER PUBLICATIONS

U.S. Appl. No. 13/167,555, filed Jun. 23, 2011, James Sorenson III et al.

U.S. Appl. No. 13/167,557, filed Jun. 23, 2011, James Sorenson III et al.

Citrix Netscaler Load Balancing Algorithms, University of Wisconsin KnowledgeBase, https://kb.wisc.edu/ns/page.php?id=13201[Apr. 14, 2013 1:16:09 PM], pp. 1-9.

"Advanced load balancing: 8 must-have features for today's network demands," Citrix Systems, Inc. NetScaler white paper, Sep. 2009, pp. 1-5.

"Is your load balancer cloud ready? How NetScaler helps enterprises achieve cloud computing benefits," Citrix Systems, Inc. NetScaler white paper, Apr. 2010, pp. 1-3.

"Load Balancing 101: Nuts and Bolts," K.J. Salchow, Jr., F5 Networks, Inc. white paper, Jul. 2007, pp. 1-6.

U.S. Appl. No. 13/909,418, filed Jun. 4, 2013, Wei Xiao et al.

U.S. Appl. No. 13/780,077, filed Feb. 28, 2013, Swaminathan Sivasubramanian, et al.

U.S. Appl. No. 13/170,031, filed Jun. 27, 2011, Swaminathan Sivasubramanian, et al.

\* cited by examiner

CONNECTION REDISTRIBUTION IN LOAD-BALANCED SYSTEMS

BACKGROUND

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store (e.g., a virtualized database) which may be distributed across multiple data storage devices or storage nodes, with each such virtualized data store acting as a distinct logical data store that provides users with the illusion that they are the sole operators and administrators of the data storage resource.

As the scale and scope of network-based applications and network-based services such as virtualized or cloud computing services have increased, network-based applications or services may include hundreds or even thousands of hardware or software nodes to which client traffic from many clients of the service or application may need to be load balanced. In an example data center or network implementing a large-scale service or application, multiple load balancers in a load balancer layer may front a fleet of nodes, with each load balancer fronting a subset of the nodes. Client connections to the service or application may be pseudo-randomly distributed among the load balancers in the load balancer layer, for example by a Domain Name Server (DNS) accessible by the clients that provides the IP addresses of the load balancers to the clients upon request. Connections from clients (e.g., Transmission Control Protocol (TCP) connections) may thus be established to particular load balancers; the load balancer to which particular client connections are established may distribute client traffic on those connections among its respective nodes according to a load balancing technique.

Load balancers are typically single, dedicated devices that include multiple network interface controllers (NICs), for example eight NICs, with some of the NICs handling inbound traffic from/outbound traffic to clients and the other NICs handling outbound traffic from/inbound traffic to the nodes that are being load balanced. Bandwidth or throughput on conventional load balancers is typically in the range of 40 Gigabits per second (Gbps) on the client side and 40 Gbps on the server side. Load balancers typically use techniques such as max connections (or max conns), round robin, and/or least connections (least conns) applied to data collected from the host devices to select which node will handle a connection. In addition, load balancers typically serve as proxies to the nodes that they front and thus terminate connections from the clients and send the client traffic to the nodes on connections established between the nodes and the load balancer. Thus, a node and a client typically do not communicate over a direct connection when using load balancers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
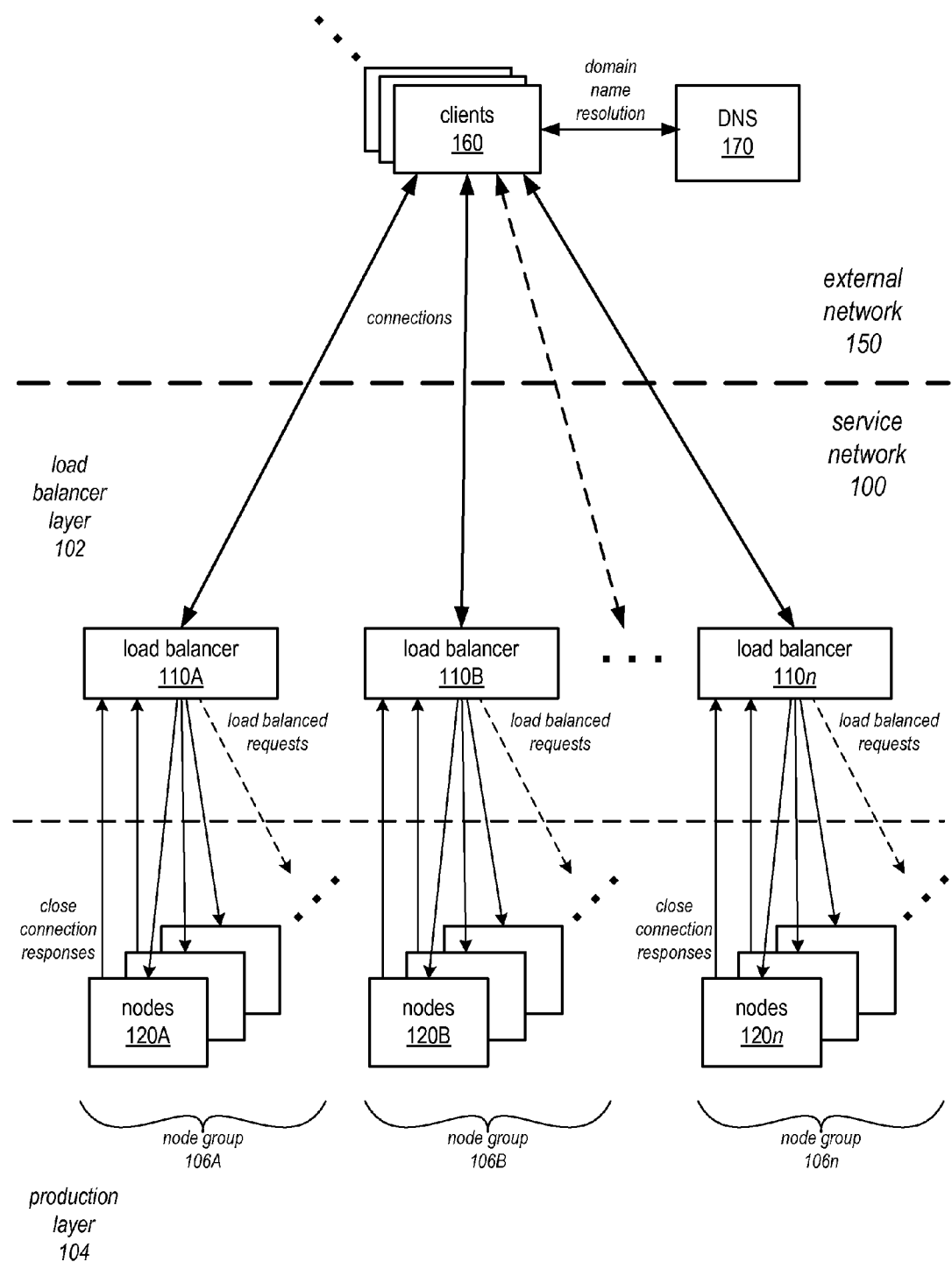
FIG. 1 illustrates an example network-based service environment in which embodiments of a connection redistribution method may be implemented.

Various embodiments of methods and apparatus for connection redistribution in load-balanced systems that include multiple load balancers each fronting multiple nodes are described. FIG. 1 illustrates an example network-based service environment in which embodiments of a connection redistribution method may be implemented. A network-based service (also referred to as a web-based service or simply web service) may be implemented in a service network 100. Examples of network-based services may include, but are not limited to, data store services, database services, and computation services. The service network 100 may implement at least a load balancer layer 102 and a production layer 104. Note that the service network 100 may be implemented in a single data center or across two or more data centers. The data centers may be geographically dispersed.

The load balancer layer 102 may include multiple load balancers 110. The load balancers 110 may, for example, be commercially available devices provided by a vendor. As an example, in some implementations the load balancers 110 may be NetScaler® load balancers provided by Citrix Systems, Inc. However, other load balancers 110 may be used in various implementations. Each load balancer 110 may be provided with one or more unique public IP address of the network-based service, each public IP address associated with a particular port (e.g., TCP port) of the load balancer 110. The public IP addresses of the load balancers 110 may be published, for example to a Domain Name Server (DNS) 170 or to some other type of endpoint discovery service or method.

The production layer 104 may include multiple nodes 120. Each node 120 may, for example, be a device such as a server device. For example, in some implementations, the nodes 120 may be rack-mounted computing devices such as blade servers installed in one or more racks within a data center or across two or more data centers. Alternatively, nodes 120 may be implemented in software (e.g., as different virtual machines, processes, threads, etc.), with one or more instances of a software node 120 implemented on each of one or more devices. In many implementations, there may be hundreds or thousands of nodes 120 on service network 110 within a data center or across two or more data centers. Each node 120 may include software and/or hardware that implements functionality of the network-based service.

The nodes 120 may be arranged in node groups 106, with each node group 106 fronted by one of the load balancers 110 in load balancer layer 102. Each node group 106 may include tens or hundreds of nodes 102. For example, in FIG. 1, load balancer 110A fronts nodes 120A in node group 106A, load balancer 110B fronts nodes 120B in node group 106B, and so on. The nodes 110 in a node group 106 may each be assigned a local or private address on service network 100 that is known to the respective load balancer 110 so that the load balancer 110 may connect to and communicate with the nodes 110 in the node group 106. For example, in at least some implementations, the nodes 110 in a node group 106 may each be assigned a unique subnet address of a public IP address assigned to the respective load balancer 110. In at least some implementations, the nodes 110 within a node group 106 may communicate node group information (e.g., presence information, health information, etc.) among the nodes 110 in the group 106, for example according to a gossip protocol. In some embodiments, the nodes 110 within a node group 106 may also communicate with nodes 110 in other node groups 106.

While FIG. 1 shows each load balancer 110 fronting a single node group 106, in some implementations at least one load balancer 110 may front two or more node groups 106, with each node group 106 corresponding to a different public IP address of the respective load balancer 110.

Clients 160 on an external network 150 may access the network-based service implemented on service network 100. In at least some embodiments, to access the service, a given client 160 may resolve a domain name of the service (e.g., a URL), for example via DNS 170. The client 160 sends the domain name of the service to the DNS 170, which selects one of the public IP addresses of the load balancers 110 and returns the selected IP address to the client 160. The DNS may implement a randomizing technique to select from among the public IP address of the load balancers 110 so that the IP addresses are pseudorandomly provided to the clients 160. (While FIG. 1 shows DNS 170 on external network 150, DNS 170 may be located on service network 100). In at least some implementations, the DNS technology may provide weighting for the different public IP addresses so that different ones of the addresses can be provided to requesting clients 160 at different rates. For example, an address with a weight of 0.2 may be provided to clients approximately twice as often as an address with a weight of 0.1. In these implementations, the weight of a particular address may be set to zero (0.0) so that the address is not provided to the clients 160.

Note that other methods and/or other types of endpoint discovery services or technologies than DNS technology may be used for clients 160 to obtain public IP addresses of the load balancers 110 in the network-based service.

Once the client 160 has obtained a public IP address of a load balancer 110, the client 160 may initiate a connection with the load balancer 110 via the public IP address according to a network communications protocol, or network protocol. In at least some implementations, the network protocol may be Transmission Control Protocol (TCP), although other network protocols may be used.

Once a connection (e.g., a TCP connection) has been established between the client 160 and a load balancer 110 according to the network protocol, the client may send one or more requests (e.g. Hypertext Transport Protocol (HTTP) requests) to the service via the connection. The load balancer 110 may select node(s) 120 from among the nodes 120 in a respective node group 106 to receive the requests from the client 160 according to a load balancing technique (e.g., max connections (or max conns), round robin, least connections (least conns), etc.). A node 120 that receives a request from a client 160 via a load balancer 110 may generate a response, which is sent by the node 120 to the load balancer 110, which then forwards the response to the respective client 160, typically via the connection on which the respective request was received from the client 160.

The load balancers 110 may serve as proxies to the nodes 160 that they front and thus may terminate the connections from the clients 160 and send the client traffic to the nodes 120 over a network substrate or fabric between the load balancers 110 and the nodes 120. In some implementations, the requests from a client 160 may be encapsulated according to an IP tunneling protocol and routed over the network infrastructure to the target nodes 110. However, the client traffic may be sent from the load balancers 110 to the nodes 120 via other methods, for example as Hypertext Transport Protocol (HTTP) traffic via TCP connections between the load balancers 110 and the nodes 120. Note that a load balancer 110 may distribute requests from a given client 160 connection to two or more of the nodes 120 in its node group 106. Thus, a node 120 and a client 160 typically do not communicate over a direct connection, and there is typically no affinity between a given client 160 and a given node 120 of the service.

There may be many clients 160, for example tens, hundreds, or thousands of clients 160, that access the network-based service on service network 110 via connections to the load balancers 110 in the load balancer layer 102. Each client 160 may initiate one, two, or more connections with the load balancers 110 as described above. Note that at least some clients 160 may locally cache the public IP addresses of the load balancers 170 obtained from the DNS 170 or other discovery service for a period (typically for minutes or hours); thus, additional connections or reconnections may in some cases be made to the same load balancer 110 by a given client 160.

There may be a wide range of usage on the connections between the load balancers 110 and the clients 160. At least some connections from some clients 160 may be heavily used, with lots of traffic (e.g. HTTP request messages) being generated by the respective clients 160. Other connections may be less used or lightly used. Also, when an application on a given client 160 starts up, one, two, or more connections with a particular load balancer 110 may be established. Conventionally, a client 160 may hold its connection(s) with the load balancer 110 for an extended period, which may be days, weeks, or even months, for example until the application is restarted. Thus, in conventional load balanced systems, an application on a client 160 may establish and hold connection(s) with a particular load balancer 110 for an extended period, and may generate a lot of traffic on the connection(s). These usage characteristics of such load balanced systems may result in situations where particular ones of the load balancers 110 in the load balancer layer 102 are heavily loaded with many busy, persistent connections to one or more clients 160 and thus receive many requests to distribute among the respective nodes 120, while others of the load balancers 110 are less used or even underutilized, even though the DNS or other discovery service may pseudorandomly distribute the public IP addresses of the load balancers 110 in the load balancer layer 102 to the clients 160.

Also, occasionally the service provider may need to take a load balancer 110 or the nodes 120 in the node group 106 fronted by a load balancer 110 offline, for example for maintenance or upgrade. The rest of the fleet in the service network 100 can take over the load when the load balancer 110 and its group 106 are offline. However, conventionally, there has not been a graceful method for taking a load balancer 110 and its node group 106 out of service.

Embodiments of a connection redistribution method are described in which each of the nodes 120 in each node group 106 may periodically initiate connection closes of one or more connections between their respective load balancers 110 and the clients 160. In at least some embodiments of the connection redistribution method, each node 120 may calculate or estimate a connection close rate according to one or more metrics, and then select random connections to which connection close requests are to be sent according to the connection close rate. In at least some embodiments, the connection close rate at each node 120 may be based on an estimation of the percentage of the overall client traffic at the respective load balancer 110 that the node 120 is handling. In at least some embodiments, the connection close rate at each node 120 may provide an indication of a number of connections that the node 120 should issue connection close requests for in an hour, although other time periods may be used. In at least some embodiments each node 120 may recalculate its connection close rate at a specified interval (e.g., once per hour) and/or upon receiving updated information. Methods for calculating or estimating a connection close rate are described later in this document.

In at least some embodiments, to select the connections to be closed, each node 120 may select random request messages (e.g., HTTP request messages) from among those received at the node 120 from its respective load balancer 110 according to the connection close rate. In at least some embodiments, to request that a connection be closed, a node 120 modifies the header of a response message (e.g., an HTTP response message) to a received request message from a client 160 to include a connection close request. The response message is sent to the respective load balancer 110, which then forwards the response message to the respective client 160 over a connection between the client 160 and the load balancer 110.

Note that some load balancers 110 may in some modes (e.g., client keep-alive (CKA) mode) mangle headers on response packets before forwarding the packets to the clients 160. Thus, in some implementations settings of the load balancers 110 may be selected so that the connection close requests are passed through to the clients 160 in the packet headers.

In response to the message including the connection close request, the client 160 may close the connection, obtain the public IP address of one of the load balancers 110 from the DNS 170 or other discovery service, and open a new connection. Since the public IP addresses of the load balancers 110 in the load balancer layer 102 are pseudo-randomly distributed to the clients 160, generally the public IP address of the load balancer 110 returned to the client will be a different load balancer 110 than the one for which the connection was closed.

As previously noted, at least some clients 160 may locally cache the public IP addresses of the load balancers 170 obtained from the DNS 170 or other discovery service for a period. When attempting to establish a new connection to a load balancer 110 after closing a connection, a client 160 may use a public IP address from its local cache. Thus, in some cases, if a client 160 has not recently flushed or refreshed its local cache of public IP addresses, the client 160 may attempt to open a connection to the same load balancer 110 for which a connection was closed in response to a connection close request.

The connection redistribution method causes the clients 160 to redistribute their connections among the load balancers 110 rather than holding connections for extended periods, which tends to spread the client connections and client traffic from all clients 160 and from particular clients 160 among the load balancers 110 in the load balancer layer 102, thus helping to avoid situations where particular ones of the load balancers 110 in the load balancer layer 102 are heavily loaded with many busy, persistent connections to particular clients 160.

In addition, in at least some embodiments, the connection close rate at each node 120 that is used in the connection redistribution method may be selected so that all client connections at each load balancer 110, and thus for the service as a whole, tend to be recycled at a given period (e.g., an hour). In at least some embodiments, to take a load balancer 110 or the nodes 120 in a node group(s) 106 fronted by a load balancer 110 offline, new connections to one or more of its public IP addresses of the load balancer 110 may be prevented by directing the DNS 170 or other discovery service to stop resolving connection requests to the public IP address(es) of the load balancer 110, for example by setting the weight(s) of the public IP address(es) to zero. Within the given period or a bit longer (e.g., within an hour or two), the nodes 120 in the node group(s) 106 corresponding to the public IP address(es) may issue connection close requests for all of the active client connections to the public IP address(es). The clients 160 may re-establish the connections with other public IP address(es) in the load balancer layer 102 via the DNS 170 or other discovery service. Thus, a load balancer 110 or a node group 106 fronted by a load balancer 110 may be easily and gracefully taken out of service within a relatively short period.

Some embodiments may provide a method or methods via which a load balancer 110 or node group 106 may be taken offline more quickly than by the above method, for example within 10 minutes rather than within an hour. For example, instead of waiting for the nodes 120 in a node group 106 to close the connections according to the current connection close rates as calculated at the nodes 120, the nodes 120 may be manually directed or programmatically directed to issue connection close requests at an accelerated rate. Manually directing the nodes 120 may, for example, involve a human operator at a console issuing command(s) to the nodes 120 via a user interface to a control program. Programmatically directing the nodes 120 may, for example, involve the nodes 120 or some other process on the network 100 monitoring the weights of the public IP addresses at the DNS 170; if the weight of a public IP address that corresponds to a node group 106 goes to zero, indicating that new connections are not being made to the public IP address, the nodes 120 in that node group 106 may automatically begin to issue close connection requests at an accelerated rate.

For example, if at the current connection close rate a node 120 includes a connection close request in a response once every 12 seconds based on a time period of one hour, the node 120 may be manually or programmatically directed to instead include a connection close request in a response once every 2 seconds based on a time period of 10 minutes. Thus, in this example, instead of waiting one hour or more for all the connections to a public IP address to be closed, the connections may be closed within 10 minutes or a bit more.

As an alternative, in some embodiments, the nodes 120 may be manually or programmatically directed to include a connection close request in the response to each Nth request received from the load balancer. For example, N can be set to 1 to cause the nodes 120 to include a connection close request in the response to each request received from the load balancer 110, or to 10 to cause the nodes 120 to include a connection close request in the response to each $10^{th}$ request received from the load balancer 110.

In some embodiments, the nodes 120 may be manually or programmatically directed to throttle down the rate at which a connection close request is included in responses from an initial rate (e.g., the current connection close rate) over a period (e.g., 10 minutes), so that connection close requests are issued at an accelerating rate over the period until, at the end, a connection close request is issued in a response to every request received from the clients 160 via the load balancer 110.

Figure 2:
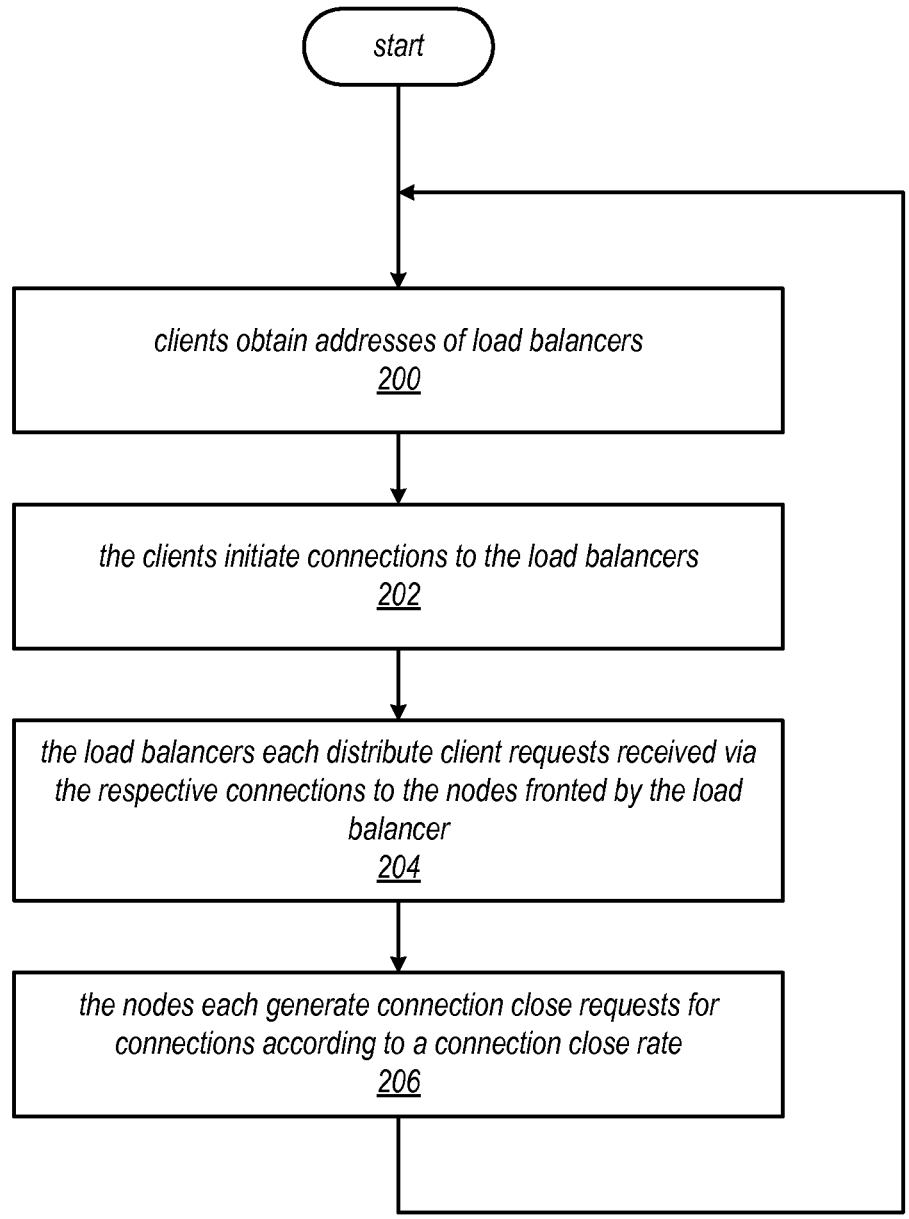
FIG. 2 is a high-level flowchart of a connection redistribution method in a load-balanced system that includes multiple load balancers each fronting multiple nodes, according to at least some embodiments.

FIG. 2 is a high-level flowchart of a connection redistribution method in a load-balanced system that includes multiple load balancers each fronting at least one node group that includes multiple nodes, according to at least some embodiments. As indicated at 200, clients of the system may obtain public IP addresses of the load balancers, for example from a Domain Name Server (DNS). In at least some embodiments, when a client wants to establish a connection to the load-balanced system, the client resolves a domain name of the system (e.g., a URL) via the DNS to obtain a public IP address of one of the load balancers. The DNS may implement a randomizing technique to select from among the public IP address of the load balancers so that the IP addresses are pseudorandomly provided to the clients. Note that, in some embodiments, other methods and/or other types of endpoint discovery services than DNS may be used to obtain the public IP addresses of the load balancers.

As indicated at 202, upon obtaining public IP addresses of the load balancers from the DNS, the clients initiate connections to the load balancers using the obtained addresses according to a network protocol, for example TCP. Once a client establishes a connection (e.g., a TCP connection) to a public IP address of a load balancer, the client may begin sending requests (e.g., HTTP requests) to the system via the load balancer. The connections may be persistent; that is, a client may hold a given connection until the client closes the connection.

As indicated at 204, the load balancers each distribute the client requests received via the client connections to the load balancer to the nodes in the node group(s) fronted by the load balancer. The load balancers may serve as proxies to the nodes that they front, and thus may terminate the connections from the clients and send the client traffic to the nodes over a network substrate or fabric between the load balancers and the nodes. A load balancer may distribute requests received on a given client connection to two or more of the nodes in a respective node group. Thus, a node and a client typically do not communicate over a direct connection, and there is typically no affinity between a given client and a given node.

As indicated at 206, the nodes each generate connection close requests for connections according to a connection close rate. In at least some embodiments, each node may generate connection close requests according to a connection close rate. In at least some embodiments, each node calculates or estimates a connection close rate for the node, and then selects random connections to which connection close requests are to be sent according to the connection close rate. In at least some embodiments, the connection close rate at each node may be based on an estimation of the percentage of the overall client traffic at the respective load balancer that the node is handling. In at least some embodiments, the connection close rate at each node may provide an indication of a number of connections that the node should issue connection close requests for in a specified time period, for example per hour. Methods for calculating or estimating a connection close rate are described later in this document. In at least some embodiments, to select the connections to be closed, each node may select random request messages (e.g., HTTP request messages) from among those received at the node from its respective load balancer according to the connection close rate.

In at least some embodiments, to request that a connection be closed, a node modifies the header of a response message (e.g., an HTTP response message) to a received request message from a client to include a connection close request. The response message is then sent to the load balancer, which forwards the response message (with the header including the connection close request) to the respective client via the connection. In response to the connection close request, the client may close the connection and attempt to open a new connection to a public IP address of a load balancer. The client may obtain the public IP address from an endpoint discovery service such as DNS or, in some cases, may obtain the public IP address from its local cache.

Alternatively, some network communications protocols may allow a client to establish a separate control connection to a load balancer via which control or other packets may be exchanged with the load balancer. In these implementations, a connection close request indicating one or more connections to be closed may be generated by a node, sent to the load balancer, and forwarded to the client via the control connection. The client may then close the connection(s) indicated by the connection close requests.

As shown by the arrow returning from element 206 to element 202 in FIG. 2, the connection redistribution method causes the clients to periodically recycle connections to the load balancers and thus tends to redistribute the client connections among the load balancers. Thus, rather than holding connections for extended periods and thus potentially overloading particular load balancers, the client connections and client traffic from all clients and from particular clients tend to be more evenly spread among the load balancers. In at least some embodiments, the connection close rate at each node may be selected so that all client connections at each load balancer, and thus for the system as a whole, tend to be recycled at a given period (e.g., an hour). This allows a given load balancer to be gracefully taken offline by stopping new connections to the load balancer and allowing the active connections to the load balancer to be closed by the respective nodes according to the connection redistribution method. As previously mentioned, in some embodiments, instead of waiting for the nodes in a node group to close the connections according to the current connection close rates as calculated at the nodes, the nodes may be manually or programmatically instructed to issue connection close requests at an accelerated rate.

Figure 3:
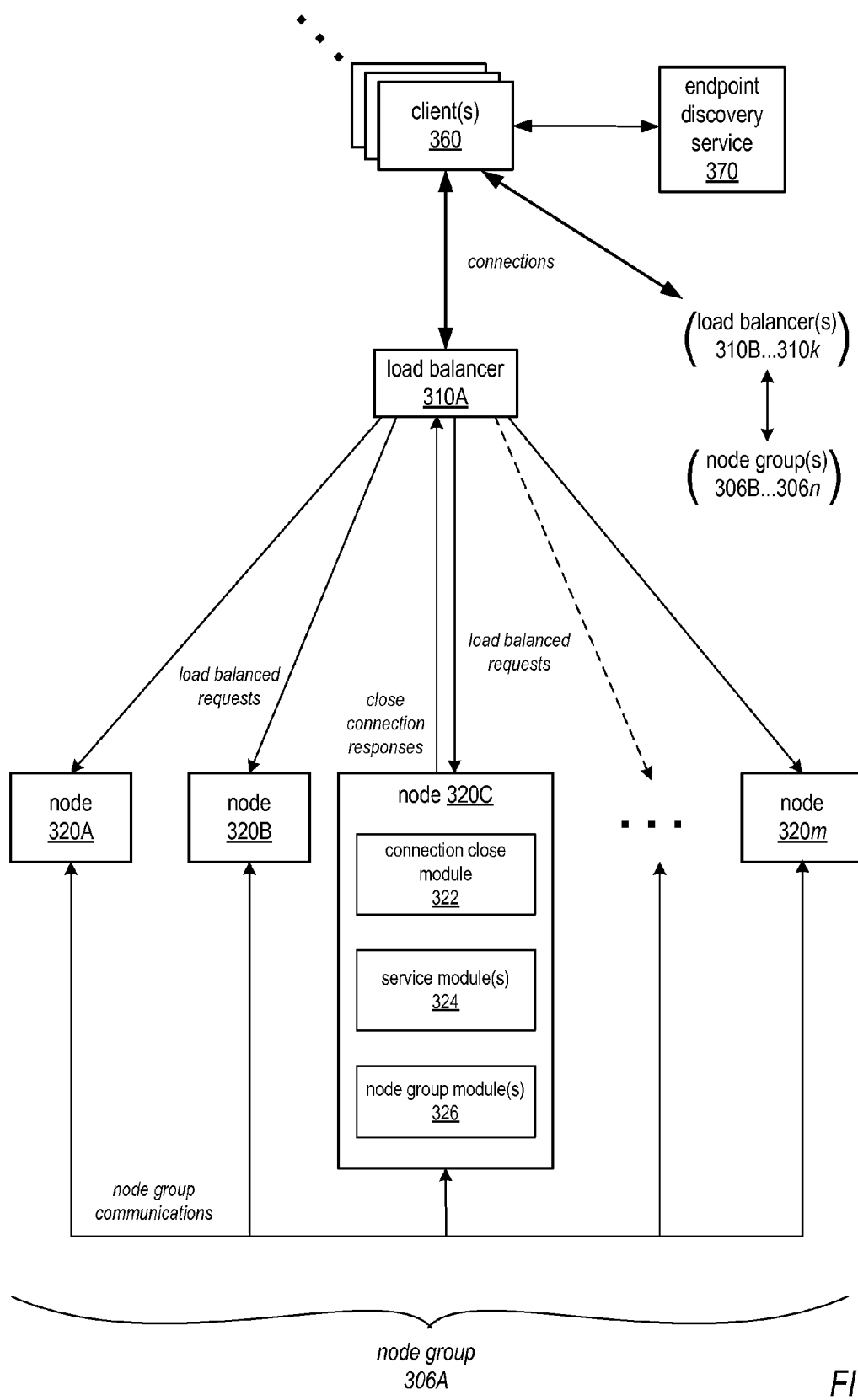
FIG. 3 illustrates an example load balancer, node group, and node in a load-balanced system in which embodiments of a connection redistribution method may be implemented.

FIG. 3 illustrates an example load balancer, node group, and node in a load-balanced system in which embodiments of a connection redistribution method may be implemented. The load-balanced system may, for example, be a network-based service as shown in FIG. 1. The load-balanced system may include two or more load balancers each fronting one or more node groups, each node group containing two or more nodes 320. In this example, the system includes k load balancers 310A-310k, each load balancer 310 fronting at least one of node groups 306A-306n, each node group 306 containing two or more nodes 320. In various embodiments, the node groups 306 may contain the same number or different numbers of nodes 320. Each node 320 is contained in only one node group 306. In this example, load balancer 310A is shown fronting node group 306A containing m nodes 320A, 320B, 320C . . . 320m.

Figure 4:
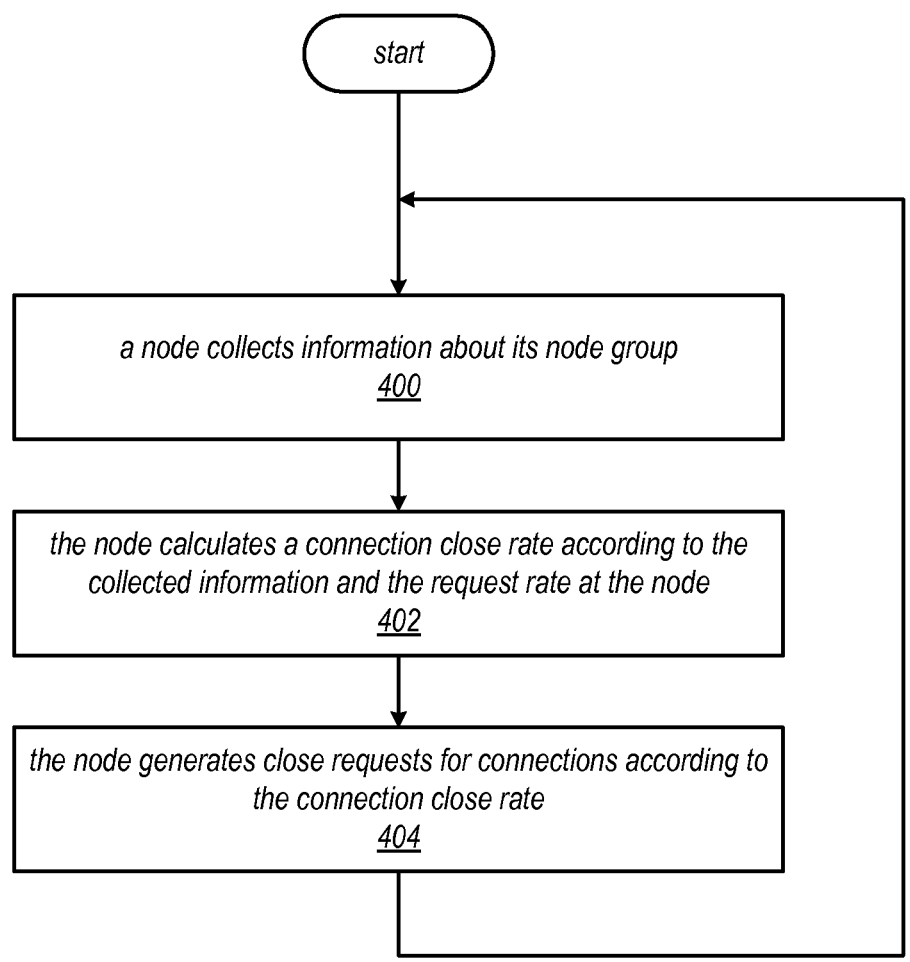
FIG. 4 is a high-level flowchart of a connection close method that may be implemented at each node, according to at least some embodiments.

In some implementations, each node 320 in the load-balanced system may be a computing device or storage device. Each node 320 may, for example, be a server device. For example, in some implementations, the nodes 320 may be rack-mounted computing devices such as blade servers installed in one or more racks within a data center or across two or more data centers. Alternatively, nodes 320 may be implemented in software, with one or more instances of node 320 implemented on each of one or more devices. Each node 320 may include several components or modules implemented in hardware and/or software on the node 320. In at least some implementations, on each node 320, one or more components implement functionality of the load-balanced system and one or more components implement node group functionality. In addition, each node 320 may include a component or module that implements an embodiment of a connection close method as described herein, for example as shown in FIG. 4. As an example, FIG. 3 shows node 320C that includes service module(s) 324 that implement functionality of a network-based service on the node 320C, node group module(s) that implement node group functionality on the node 320C, and a connection close module 322 that implements the connection close method on the node 320C. Note that each node 320 in each node group 306 may be similarly configured.

Clients 360 may obtain the public IP addresses of the load balancers 310 from an endpoint discovery service 370, for example from a Domain Name Server (DNS). In at least some embodiments, when a client 360 wants to establish a connection to the load-balanced system, the client 360 resolves a domain name of the system (e.g., a URL) via the endpoint discovery service 370 to obtain a public IP address of one of the load balancers 310, for example a public IP address of load balancer 310A. The endpoint discovery service 370 may implement a randomizing technique to select from among the public IP address of the load balancers 310 so that the IP addresses are pseudorandomly provided to the clients 360. Note that, in some embodiments, other methods may be used for clients 360 to obtain public IP addresses of the load balancers 310.

Upon obtaining a public IP address of load balancer 310A, for example from the endpoint discovery service 370, a client 360 may initiate one or more connections to the load balancer 310A according to a network protocol, for example TCP. Once the client 360 establishes a connection (e.g., a TCP connection) to load balancer 310A via the public IP address, the client 360 may begin sending requests (e.g., HTTP requests) to the system via the load balancer 310A. The connections may be persistent; that is, the client 360 may hold a given connection until the client 360 closes the connection.

Load balancer 310A distributes the client requests (e.g., HTTP requests) received via the client connections to the public IP address among the nodes 320A-320m in node group 306A. The load balancer 310A may serve as a proxy to the nodes 320 in node group 306A, and thus may terminate the connections from the clients 360. Load balancer 310A distributes the client requests received via the connections among the nodes 320 according to a load balancing technique, and sends the client requests to the nodes 320 over connections between the load balancer 310A and the nodes 320.

Thus, node 320C receives a portion of the client requests (e.g., HTTP requests) that are received by load balancer 310A at the public IP address. Service module(s) 324 on node 320A may handle each received request to perform one or more functions of the service or application implemented by the load-balanced system according to the respective request. For example, in a database service, a request may be a database query request, and the service module(s) 324 may process the database query according to the request. Node 320C may generate a response message or messages (e.g., HTTP response message(s)) for at least some of the received and processed requests. The response messages are sent by the node 320C to the load balancer 310A, which then routes the response messages to the appropriate client 360 via the respective connection.

Node group module(s) 326 on node 320C may communicate with other nodes 320 in the node group 306A to exchange or propagate node group information, such as presence information and health information. In at least some embodiments, the nodes 320 may propagate node group information among the node group 306A according to a gossip protocol. In some embodiments, nodes 320A-320m in node group 306A may also communicate with nodes 320 in other node groups 306B-306n via node group modules 326 to obtain information about the other node groups.

Connection close module 322 on node 320C may calculate or estimate a connection close rate for node 320C according to one or more metrics obtained by the module 322, for example one or more metrics related to the request rate at node 320C and one or more metrics obtained from the node group information collected by node group module(s) 326. In at least some embodiments, the connection close rate for node 320C may be based on an estimation of the percentage of the overall client traffic received by load balancer 310A that the node 360C is handling. In at least some embodiments, the connection close rate at node 360C may provide an indication of a number of connections that node 360C should issue connection close requests for in a specified time period, for example X connection close requests per hour.

After calculating the connection close rate, connection close module 322 may then generate connection close requests for selected connections according to the connection close rate. In at least some embodiments, to select the connections to be closed, connection close module 322 may select random request messages (e.g., HTTP request messages) from among those received at the node 320C from load balancer 310A according to the connection close rate. In at least some embodiments, to request that a connection be closed, connection close module 322 modifies the header of a response message (e.g., an HTTP response message) to a received request message from a client 360 to include a connection close request.

Upon receiving a response message that includes a connection close request from node 320C, load balancer 310A forwards the response message with the connection close request to the appropriate client 360 via a connection between load balancer 310A and the client 360. In some implementations, settings of the load balancer 310A may be selected so that the connection close request in the header is passed through to the client 360. Upon receiving the response message, the client 360 may close the connection, contact the endpoint discovery service 370 to obtain a new public IP address for a load balancer 310, and then initiate a new connection to the respective load balancer 310 via the public IP address.

FIG. 4 is a high-level flowchart of a connection close method that may be implemented at each node, according to at least some embodiments. As indicated at 400, each node may collect information about its node group. To calculate the connection close rate at a node, the node needs at least an estimate of how many nodes are in its node group. The number of nodes in the node group may be obtained or estimated using different techniques in various embodiments. Example methods for obtaining or estimating the number of nodes in a node group are given below, and are not intended to be limiting.

In some embodiments, the nodes in a node group may communicate with the nodes in its node group and with the nodes in other node groups to obtain information about all the nodes and node groups in the system. The node may use this information to determine how many total nodes and node groups are in the system, and may use the average number of nodes in the node groups as an estimate. For example, if there are 10 node groups and 1000 nodes in the system, then the average number of nodes in a node group is 100.

In some embodiments, each node may collect information from and share information with the other nodes in its node group, for example via a gossip protocol. For example, each node may share its health and presence information with other nodes in the node group, and may collect health and presence information from other nodes in the node group. The node may use this information to determine how many healthy nodes are in its node group.

In some embodiments, a central or authoritative service may maintain membership information for each node group or for all the node groups in the system, and each node may obtain information about its node group (e.g., how many healthy nodes are in the node group) from the service.

As indicated at 402 of FIG. 4, the node calculates a connection close rate according to the collected information and the request rate at the node. In at least some embodiments, the connection close rate for the node may be based on an estimation of the percentage of the overall client traffic received by the respective load balancer that the node is handling. The connection close rate for a node may provide an indication of a number of connections that the given node should request to be closed in a specified time period, for example one hour. As indicated at 404, the node generates close requests for connections according to the connection close rate. As shown by the arrow returning from 404 to 400, the node may periodically or aperiodically recalculate the connection close rate, for example once per hour.

Calculating or Estimating the Connection Close Rate

As previously mentioned, the connection close rate for a node provides an indication of a number of connections that the respective node should request to be closed in a specified time period. In at least some embodiments, each node in a node group may calculate or estimate a connection close rate for the respective node. In at least some embodiments, the connection close rate at each node in a node group may be determined according to a function of the number of healthy nodes in the node group, the number of requests per second handled at that node, and some configured or specified time period, for example one hour. The following describes some example methods for calculating or estimating the connection close rate that may be used in some embodiments. Note, however, that other methods for calculating or estimating the connection close rate may be used in some embodiments.

The following is an example of a method for calculating a connection close rate at a node that may be used in some embodiments, and is not intended to be limiting. The node may track requests received at the node and estimate how many requests are received in a second at the node. The node may also obtain or estimate a total number of healthy nodes in the node group, for example according to one of the methods described above in relation to FIG. 4. The number of requests received in a second at the node times the total number of healthy nodes in the node group gives an estimated request rate per second for the node group. The estimated request rate per second for the node group may be used as the total number of connections to be closed by the node group in an hour. The node calculates an estimate of the percentage of the overall traffic that it is serving. For example, if there are 100 nodes in the node group, the node may be serving $1/100^{th}$ (1%) of the traffic. The number of connections that the node is to close in an hour is then this percentage of the total number of connections to be closed in an hour. For example, if 100,000 connections are to be closed in an hour, and the node is serving 1% of the traffic, then the node may request that 1000 connections be closed in an hour. Since there are 3600 seconds in an hour, this would be 3600/1000=1 connection close request every 3.6 seconds issued by the node (the connection close rate for the node). The following formalizes this example method for calculating a connection close rate at a node:

R: requests per second at the node

Y: total number of healthy nodes in the node group

T=R*Y: estimated request rate per second for the node group

C=T: total number of connections to be closed in an hour

P=1/Y: percentage of the overall traffic that the node is serving

N=C*P: the number of connections the node is to close in an hour

CR=3600/N: connection close rate for the node

As another example, suppose that R=200, and H=300. Then:

T=200*300=60000
C=60000
P=1/300=0.0033
N=60000*0.0033=200
CR=3600/200=18 seconds In some embodiments, the above formula may be modified by weighting the total number of connections to be closed in an hour with a weight W, for example as:

C=WT: weighted total number of connections to be closed in an hour Given W=2 in the above example:
C=2*60000=120000
P=1/300=0.0033
N=120000*0.0033=400
CR=3600/400=9 seconds Note that different ones of the nodes in a node group may determine different values for R in the above equations, and thus the different nodes may calculate different connection close rates. Less busy nodes may tend to determine lower values for R, while busier nodes may tend to determine higher values for R. Because of this, the busier nodes may tend to generate connection close requests more frequently than the less busy nodes.

The following is an example of another method for calculating a connection close rate at a node that may be used in some embodiments, and is not intended to be limiting. In this method, a number of client connections per second at the load balancer may be used to determine how many connections are to be closed in a specified time period (e.g., one hour). This value may be a specified value that is input to or acquired by the nodes, and may be the same for all nodes in a node group (but may be different for different node groups). A weight W may also be used; the weight may be applied to the number of client connections per second at the load balancer:

X: client connections/second at the load balancer
WX: total number of connection close requests to be issued per hour
Y: total number of healthy nodes in the node group
WX/Y: number of connection close requests to be issued per node per hour This yields one connection to be closed every Y/WX hours. The request rate at the node is taken into account:

R: request rate per second at the node

In Y/WX hours, the node will serve approximately R*Y/WX*3600 requests. The node thus issues a connection close request every (R*Y/WX*3600) requests (the connection close rate for the node). As an example, given X=300, Y=218, W=2, and R=200 at a node, the connection close rate for the node is:

$$R*Y/2X*3600=200*218/600*3600=261600$$

In other words, the node may issue a connection close request approximately every 261600 requests. Since the request rates for the nodes are used in the calculations at the nodes, clients making a higher number of requests to the load balancer will tend to have their connections recycled more frequently and thus move to a different load balancer for subsequent requests.

The above describes some example methods for calculating the connection close rate at each node in a node group as some function of the number of healthy nodes in the node group, the number of requests per second handled at that node, and a specified time period. The connection close rate calculated at each node using these methods may be an estimate of the number of connection close requests that the node should issue in the specified time period. As previously noted, different ones of the nodes in a node group may determine different values for R (request rate per second at the node) in the above methods, and thus the different nodes may calculate different connection close rates. However, the connection close rates calculated at all nodes may collectively tend to achieve an overall connection close rate for the node group via which all connections at the respective load balancer may be closed within some range (e.g., +/- some number of minutes or seconds) of the specified time period.

In some embodiments, a method for calculating the connection close rate at each node in a node group such as the examples given above may introduce randomness to the calculations by using a random factor Z in the calculations at the nodes. For example, the connection close rate estimated for each node may be multiplied by a Z value that is randomly generated at each node. Z may be randomly generated within some specified range, for example between 0.9 and 1.1. As an example, given X=300, Y=218, W=2, R=200, and Z=1.05 at a node, the connection close rate for the node is:

$$R*Y/2X*3600*Z=200*218/600*3600*Z=261600*1.1=287760$$

Randomness may instead or also be introduced at other points in the calculations. For example, the weight W that is applied to the total number of connections to be closed in an hour may be randomly generated within a specified range at each node or multiplied by a random factor Z at each node.

In some embodiments, instead of or in addition to introducing a random factor or factors into the calculations of the connection close rate, the connection close rate may be calculated and then randomness may be introduced in its application. As indicated above, the connection close rate may be given as either some number of requests n (e.g., every n requests) or as some time interval t (e.g., every t seconds). In various embodiments, the nodes may either issue close requests based on the number of requests (i.e., every nth request) or based on the time interval (e.g., every t seconds). To introduce randomness, n or t may be randomly varied within some range or percentage, for example +/-10%.

The above methods for calculating or estimating a connection close rate and for introducing randomness into the connection close rate are given by way of example and are not intended to be limiting. One of ordinary skill in the art will recognize that other methods for calculating or estimating a connection close rate and for introducing randomness into the calculations may be used.

In some embodiments, each node may collect and use information about particular clients or connections and apply that information to make decisions about which connections to close and/or about how often to close connections for particular clients. For example, in some embodiments, each node may use information in the requests (e.g., the client's IP address and/or the client's identity) to track requests per second per client. The node may then calculate or estimate a close request rate per client according to the information collected per client, or alternatively may distribute or allocate the calculated overall close request rate for the node among the clients according to the information collected per client. For example, in some embodiments, the node may generate connection close requests for busier clients at a lower rate or less frequently than connections for less busy clients as determined from the information collected per client. In some embodiments, a randomizing factor may be used in allocating the calculated overall close request rate for the node across the clients.

In some embodiments, the collected client information may be shared with other nodes in the node group (e.g., via a gossip protocol), and thus the nodes may determine close request rates for particular clients based on global information for the clients. Since there may be many clients and tracking the clients may be expensive, in some embodiments, the request rate for only a subset of the clients (e.g., the B busiest clients) may be tracked and used to determine connection close request rates for the subset of the clients.

In some embodiments, in addition to propagating (e.g., via a gossip protocol) presence and health information among the node group which the nodes use to determine the number of healthy nodes and thus the total request rate, the nodes may also propagate their local request rate information to the other nodes in the node group. Each node may then calculate its close request rate so that the node closes a number of connections proportional to its load relative to that of the other nodes.

Recycling a Client Connection

Figure 5:
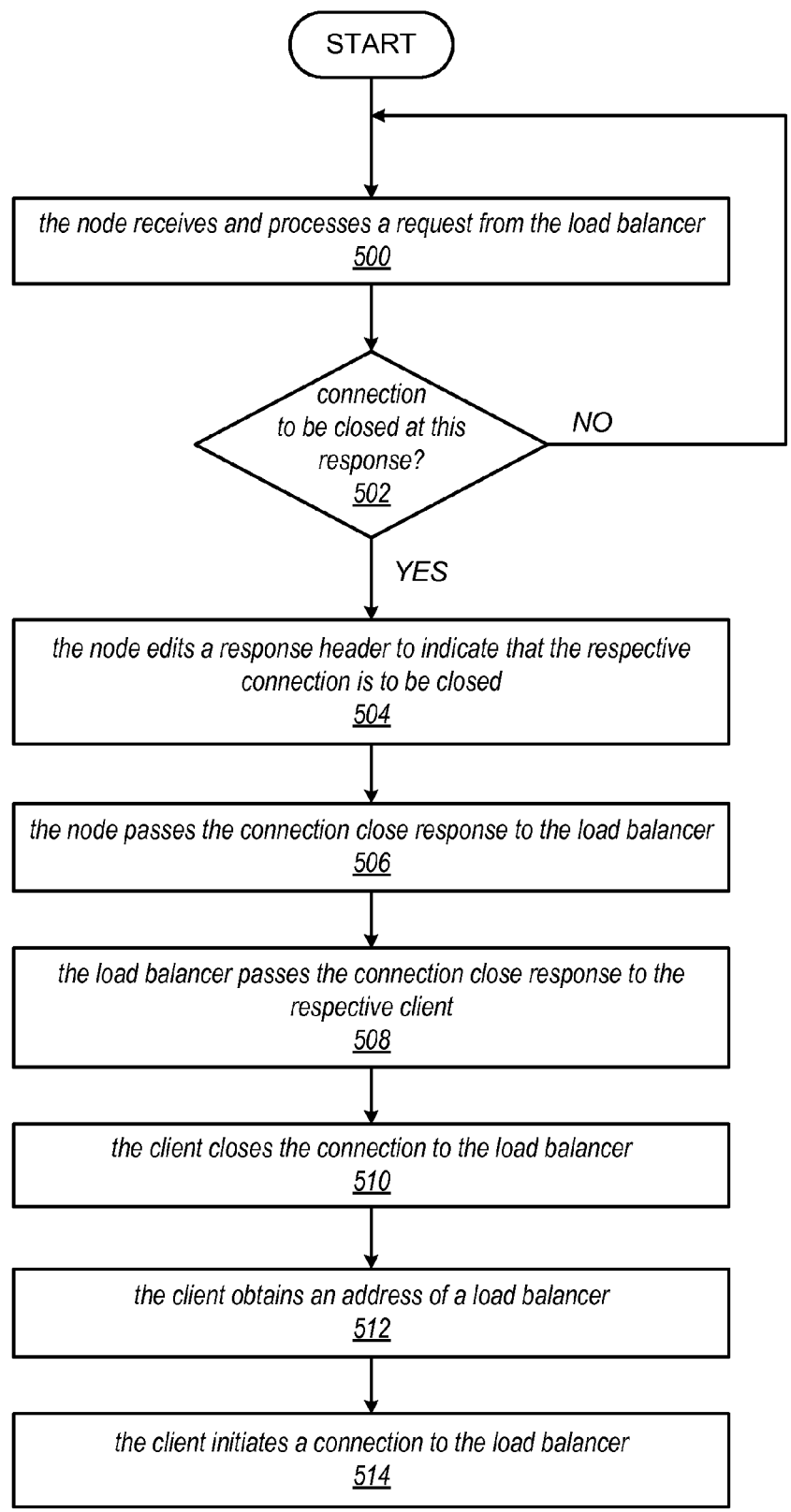
FIG. 5 is a flowchart of a method for recycling a client connection to load balancers in a load-balanced system using an embodiment of a connection close method as described herein.

FIG. 5 is a flowchart of a method for recycling a client connection to load balancers in a load-balanced system using an embodiment of a connection close method as described herein. As indicated at 500, a node in a node group receives and processes requests from the load balancer that fronts that node group. The node determines requests for which the connection is to be closed according to the connection close rate at the node, as previously described. At 502, if a connection is to be closed at a given response as determined by the connection close rate, then the node edits the header of a response message to indicate that the respective connection is to be closed, as indicated at 504. For example, the response message may be an HTTP message, and the node may edit the HTTP header to indicate that the connection is to be closed. As indicated at 506, the node passes the connection close response to the load balancer. As indicated at 508, the load balancer passes the connection close response to the respective client via the respective connection. As indicated at 510, the client closes the connection to the load balancer. As indicated at 512, the client obtains the public IP address of a load balancer in the load balancer layer of the system, for example from an endpoint discovery service (e.g., DNS). As indicated at 512, the client initiates a connection to the load balancer using the obtained public IP address. Since the endpoint discovery service pseudorandomly distributes the IP addresses of the load balancers in the load balancer layer to the clients, generally the public IP address of the load balancer returned to the client will be a different load balancer than the one for which the connection was closed.

Alternatively, some network communications protocols may allow a client to establish a separate control connection to a load balancer via which control or other packets may be exchanged with the load balancer. In these implementations, a connection close request indicating one or more connections to be closed may be generated by a node, sent to the load balancer, and forwarded to the client via the control connection. The client may then close the connection(s) indicated by the connection close requests.

The connection redistribution method causes the clients to redistribute their connections among the load balancers rather than holding connections for extended periods, which tends to spread the client connections and client traffic from all clients and from particular clients among the load balancers in the load balancer layer of the system, thus helping to avoid situations where particular ones of the load balancers are heavily loaded with many busy, persistent connections to particular clients. In addition, to take a load balancer or the nodes in the node group fronted by a load balancer offline, new client connections may be prevented to the load balancer (for example, by directing the endpoint discovery service (e.g., a DNS) to not resolve connection requests to the public IP address(es) of that load balancer) and, within a given period or a bit longer (e.g., within an hour or two), the nodes in the node group fronted by that load balancer may issue connection close requests for all of the active client connections at the load balancer. Since new client connections are not being made to the load balancer, after most or all of the client connections are closed, the load balancer and/or nodes can be serviced as needed.

Example Implementation

Figure 6:
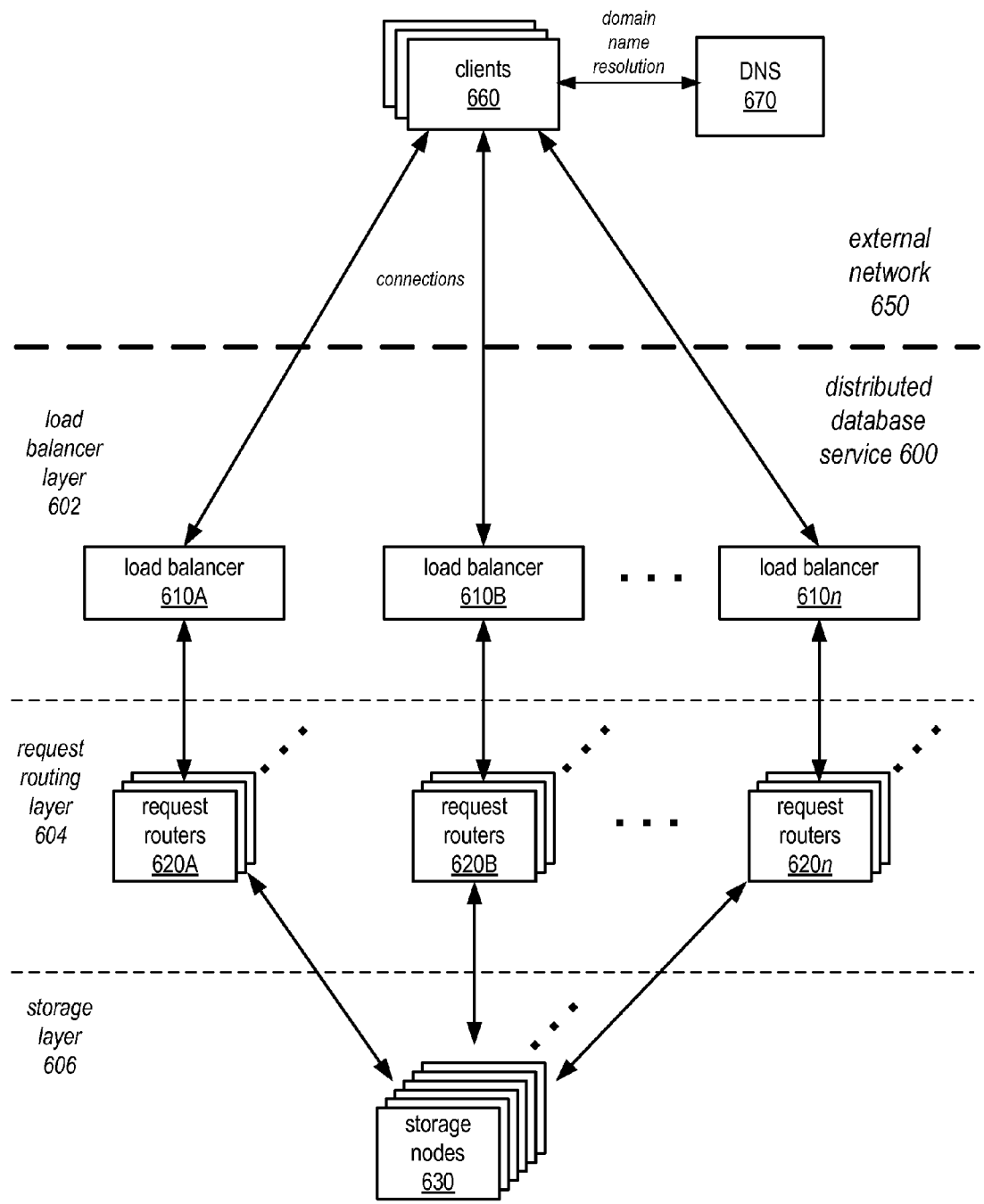
FIG. 6 illustrates an example network-based distributed database service in which embodiments of a connection redistribution method may be implemented.

While embodiments of the connection redistribution method may be implemented in any load balanced system that includes multiple load balancers each fronting multiple nodes, the following describes, as an example of such a load balanced system, a network-based distributed database service 600 in which embodiments may be implemented, as illustrated in FIG. 6. The distributed database service 600 may, for example, provide relational and/or non-relational database functionality to clients 660 in single-tenant and/or multi-tenant environments. The clients 660 may receive the database services from a web-based service provider and may negotiate with the service provider to obtain access to resources for those services, including storage resources and input/output throughput capacity. The distributed database service 600 may include a load balancer layer 602, a front-end or request routing layer 604, and a back-end or storage layer 606.

The load balancer layer 602 may include multiple load balancer 610 devices. The load balancers 610 may, for example, be commercially available devices provided by a vendor. Each load balancer 610 may be provided with a unique public IP address of the distributed database service 600; the public IP addresses of the load balancers 610 may be published, for example to a Domain Name Server (DNS) 670.

The storage layer 606 may include tens, hundreds or thousands of storage nodes 630. Each storage node 630 may include data, software, and/or hardware that implements at least database storage functionality of the distributed database service 600.

The request routing layer 604 may include tens, hundreds or thousands of request routers 620. Each request router 620 may include data, software, and/or hardware that implements at least request routing functionality of the distributed database service 600. The request routers 620 may be arranged in groups, with each group fronted by a different one of the load balancers 610 in load balancer layer 602. Each group may include tens or hundreds of request routers 620. In some implementations, the request routers 620 and storage nodes 630 may be implemented as or on separate physical devices. Alternatively, the request routers 620 may be co-located on physical devices that implement the storage nodes 630. In at least some implementations, each request router 620 in request router layer 604 may be configured to route requests (e.g., HTTP requests) received from clients 660 via a respective load balancer 610 to appropriate ones of the storage nodes 630 in storage layer 606. Each request router 620 may also include a module that implements an embodiment of the connection close method as described herein, for example as illustrated in FIGS. 4 and 5.

Figure 7A:
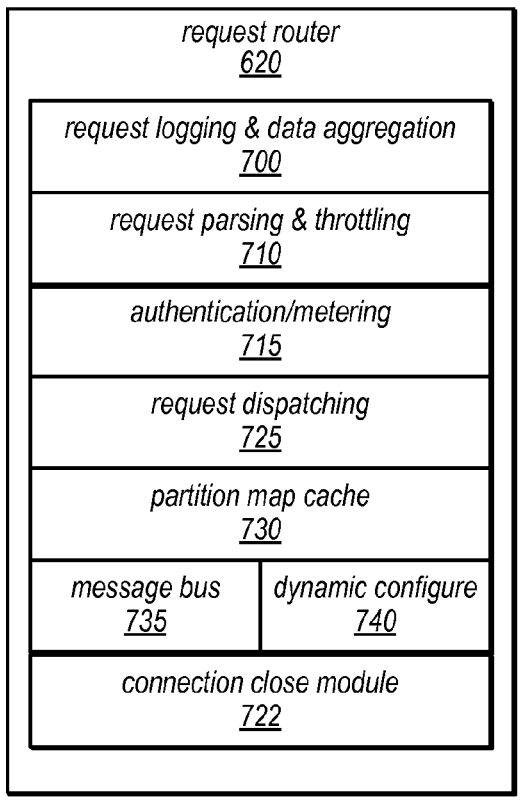
FIG. 7A illustrates an example embodiment of a request router including a connection close module in the example network-based distributed database service illustrated in FIG. 6.
Figure 7B:
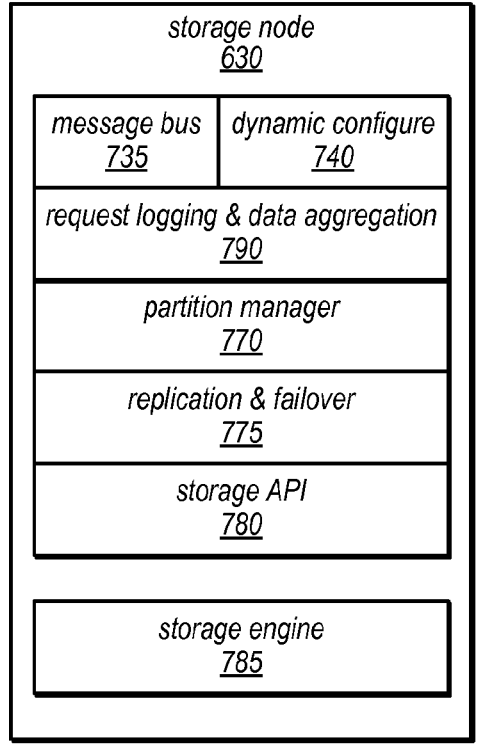
FIG. 7B illustrates an example embodiment of a storage node in the example network-based distributed database service illustrated in FIG. 6.

FIGS. 7A and 7B illustrate example embodiments of a request router 620 and a storage node 630, and are not intended to be limiting. As illustrated in FIG. 7A, a request router 620 instance may include one or more modules configured to perform parsing and/or throttling of service requests (shown as 710), authentication and/or metering of service requests (shown as 715), dispatching service requests (shown as 725), logging and/or aggregation of request data (700), and/or maintaining a partition map cache (shown as 730). In addition to these component-specific modules, request router 620 may include components that are common to multiple types of computing nodes that collectively implement a Web services platform, such as a message bus (shown as 735) and/or a dynamic configuration module (shown as 740). While not shown, request router 620 may also include one or more modules for communicating with other request routers 620 in a group to exchange or propagate group information, such as presence information and health information. In at least some embodiments, request routers 620 may propagate group information according to a gossip protocol.

Request router 620 may also include a connection close module 722 that implements an embodiment of the connection close method as described herein, for example as illustrated in FIGS. 4 and 5. Connection close module 722 may calculate a connection close rate for the request router 620 according to one or more metrics, for example one or more metrics related to the request rate at request router 620 and one or more metrics obtained from collected group information. In at least some embodiments, the connection close rate may be based on an estimation of the percentage of the overall client traffic received by the load balancer 610 that the request router 620 is handling. In at least some embodiments, the connection close rate at request router 620 may provide an indication of a number of connections that request router 620 should issue connection close requests for in a specified time period, for example X connection close requests per hour. After calculating the connection close rate, connection close module 722 may generate connection close requests for selected connections according to the connection close rate. In at least some embodiments, to select the connections to be closed, connection close module 722 may select random request messages (e.g., HTTP request messages) from among those received at request router 620 from its load balancer 710 according to the connection close rate. In at least some embodiments, to request that a connection be closed, connection close module 722 modifies the header of a response message (e.g., an HTTP response message) to a received request message from a client 660 to include a connection close request.

As illustrated in FIG. 7B, a storage node 630 instance may include one or more modules configured to provide partition management (shown as 770), to implement replication and failover processes (shown as 775), and/or to provide an application programming interface (API) to underlying storage (shown as 780). As illustrated in this example, each storage node instance 860 may include a storage engine 785, which may be configured to maintain (i.e. to store and manage) one or more tables (and associated table data) in storage 780 (which in some embodiments may be a non-relational database) on behalf of one or more clients 660. In some embodiments, each storage node 630 instance may also include a request logging and data aggregation component 790, which may perform some or all of request logging, data collection, and/or data aggregation functions for generating (e.g., computing) and presenting metrics and/or reports. In addition to these component-specific modules, storage node 630 instance may include components that are common to the different types of computing nodes that collectively implement a Web services platform, such as a message bus (shown as 735) and/or a dynamic configuration module (shown as 740).

Illustrative System

Figure 8:
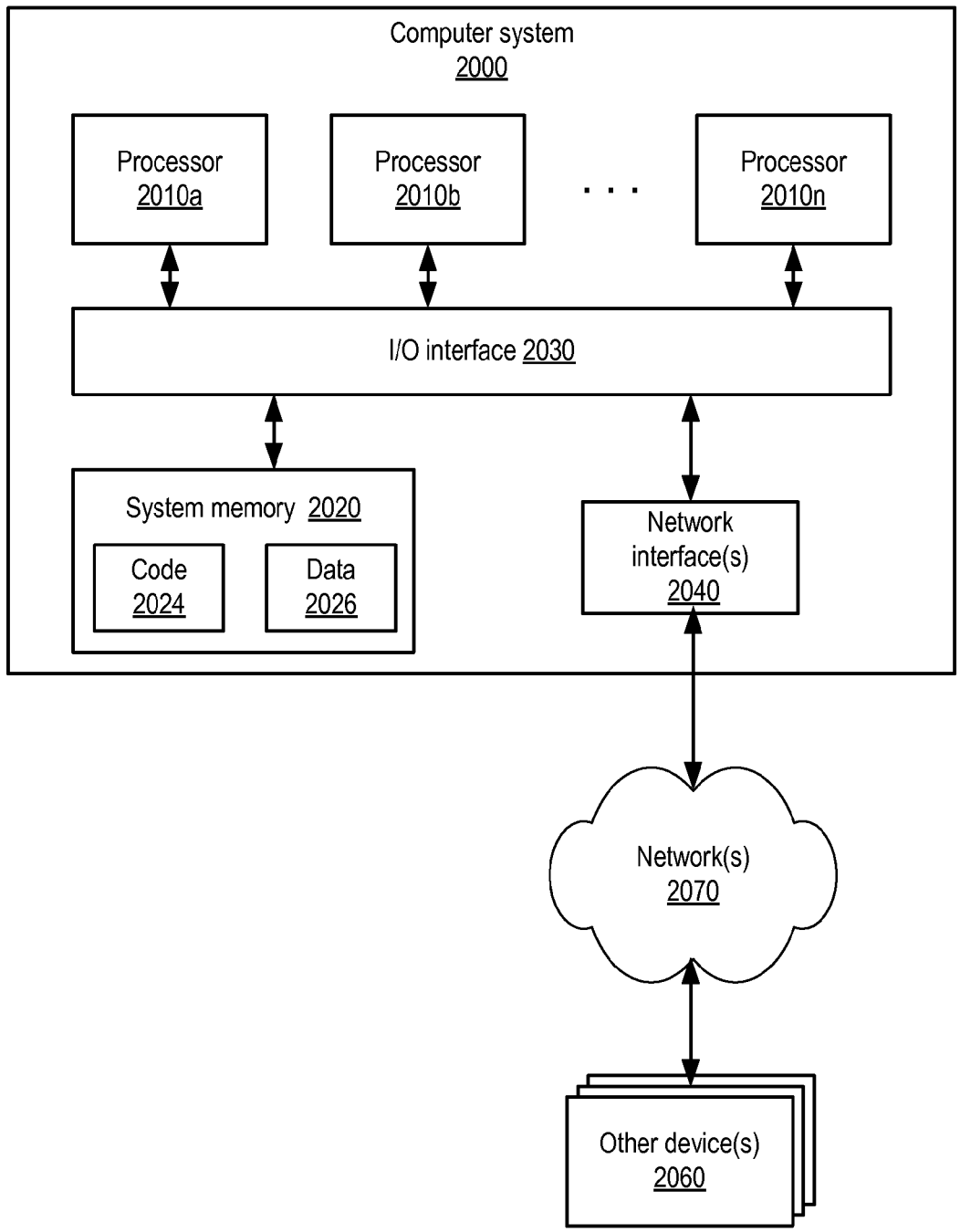
FIG. 8 is a block diagram illustrating an example computer system that may be used in some embodiments.

In at least some embodiments, a server that implements a portion or all of the connection redistribution methods and apparatus for load-balanced systems as described herein may include a general-purpose computer system that includes or is configured to access one or more computer-accessible media, such as computer system 2000 illustrated in FIG. 8. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the connection redistribution methods and apparatus, are shown stored within system memory 2020 as code 2024 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 7B, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 7B for implementing embodiments of a connection redistribution method in a load-balanced system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A network-based system, comprising:
a plurality of computing devices implementing a plurality of nodes each configured to provide one or more functionalities of the network-based system, wherein the plurality of nodes are grouped into a plurality of node groups each comprising two or more of the nodes; and
a plurality of load balancers each fronting at least one of the plurality of node groups, each load balancer configured to:
receive client requests from a plurality of client devices via connections over a network between the client devices and the load balancer; and
distribute the received client requests among the nodes in a node group corresponding to the load balancer according to a load balancing technique;
wherein each of the plurality of nodes is further configured to:
generate connection close requests for connections between the client devices and a corresponding one of the plurality of load balancers according to a connection close rate for the node, each connection close request indicating one or more connections; and
send the connection close requests to the corresponding load balancer;
wherein each load balancer is further configured to forward connection close requests received from the nodes in its corresponding node group to appropriate ones of the plurality of client devices via respective connections; and
wherein a connection close request received from one of the plurality of load balancers causes a client device to close one or more indicated connections to the load balancer and open one or more new connections to at least one of the plurality of load balancers.

2. The network-based system as recited in claim 1, wherein each of the plurality of nodes is further configured to estimate the connection close rate for the node according to a percentage of the client requests received by the corresponding load balancer that are distributed to the node.

3. The network-based system as recited in claim 2, wherein each of the plurality of nodes is further configured to estimate the percentage according to a number of healthy nodes in the respective node group, a number of requests per second handled at the node, and a specified time period.

4. The network-based system as recited in claim 1, wherein the connection close rate for a given node provides an indication of a number of connections the given node should request to be closed in a specified time period.

5. The network-based system as recited in claim 1, wherein, to generate connection close requests for connections between the client devices and a corresponding one of the plurality of load balancers according to a connection close rate for the node, each of the plurality of nodes is configured to:
select client requests received from the corresponding load balancer according to the connection close rate at the node; and
for each selected client request, modify a header of a response message to include a connection close request.

6. The network-based system as recited in claim 5, wherein the client requests and the response messages are Hypertext Transport Protocol (HTTP) messages.

7. The network-based system as recited in claim 1, wherein the connections between the client devices and the plurality of load balancers are Transmission Control Protocol (TCP) connections.

8. The network-based system as recited in claim 1, wherein the network-based system is configured to implement a distributed database service, wherein each of the plurality of nodes is a request router of the distributed database service, wherein each request router is configured to route client requests received from a corresponding load balancer to appropriate ones of a plurality of storage nodes of the distributed database service.

9. A method, comprising:
receiving, at each node in a node group from a load balancer of a plurality of load balancers, a plurality of client requests, wherein the load balancer distributes client requests received via connections between the load balancer and clients among a plurality of nodes in the node group;

generating, at each node in the node group, connection close requests for connections between the clients and the load balancer, each connection close request indicating one or more connections; and sending the connection close requests to the respective clients via the load balancer;

wherein, in response to at least one connection close request, a respective client closes one or more indicated connections to the load balancer and opens one or more new connections to at least one of the plurality of load balancers.

10. The method as recited in claim 9, wherein said generating connection close requests for connections between the clients and the load balancer comprises, at each node in the node group:

selecting one or more received client requests according to a connection close rate for the node, wherein the connection close rate for a node provides an indication of a number of connections between the load balancer and the clients that the respective node should request to be closed in a specified time period; and generating, for each client request selected at the node, a connection close request for a connection between the load balancer and a respective client.

11. The method as recited in claim 10, wherein said generating a connection close request for a connection between the load balancer and a respective client comprises modifying a header of a response message to the client request to include a connection close request.

12. The method as recited in claim 9, further comprising estimating a connection close rate for each node in the node group according to an estimate of a percentage of the client requests received by the load balancer that are distributed to the node, wherein the connection close rate for a node provides an indication of a number of connections between the load balancer and the clients that the respective node should request to be closed in a specified time period.

13. The method as recited in claim 9, further comprising estimating a connection close rate for each node in the node group according to a number of healthy nodes in the node group, a number of requests per second handled at the node, and a specified time period, wherein the connection close rate for a node provides an indication of a number of connections between the load balancer and the clients that the respective node should request to be closed in a specified time period.

14. The method as recited in claim 9, further comprising:

estimating a connection close rate for each node in the node group, wherein the connection close rate for a node provides an indication of a number of connections between the load balancer and the clients that the respective node should request to be closed in a specified time period;

determining, by at least one of the nodes in the node group, client request rates for at least two clients; and distributing the connection close rate of the at least one node among the at least two clients according to the client request rates for the at least two clients so that connection close requests are generated less frequently for at least one client than for at least one other client.

15. A non-transitory computer-accessible storage medium storing program instructions computer-executable to implement:

estimating a connection close rate for each node in a node group fronted by one of a plurality of load balancers, wherein the connection close rate for a given node provides an indication of a number of connections between the respective load balancer and client devices the given node should request to be closed in a specified time period;

generating, by each node in the node group, connection close requests for connections between the client devices and the respective load balancer according to the connection close rate for the node, each connection close request indicating one or more connections; and sending the connection close requests to the respective client devices via the load balancer;

wherein, in response to at least one connection close request, a respective client device closes one or more indicated connections to the load balancer and opens one or more new connections to at least one of the plurality of load balancers.

16. The non-transitory computer-accessible storage medium as recited in claim 15, wherein, in said generating connection close requests for connections between the client devices and the respective load balancer according to the connection close rate for the node, the program instructions are computer-executable to implement:

selecting one or more client requests received from the load balancer according to the connection close rate for the node; and generating, for each client request selected at the node, a connection close request for a connection between the load balancer and a respective client device.

17. The non-transitory computer-accessible storage medium as recited in claim 16, wherein, in said generating a connection close request for a connection between the load balancer and a respective client device, the program instructions are computer-executable to implement modifying a header of a response message to the client request to include a connection close request.

18. The non-transitory computer-accessible storage medium as recited in claim 15, wherein, in said estimating the connection close rate for each node in the node group, the connection close rate for each node is estimated according to a percentage of client requests received by the load balancer that are distributed to the node.

19. The non-transitory computer-accessible storage medium as recited in claim 15, wherein, in said estimating the connection close rate for each node in the node group, the connection close rate for each node is estimated according to a number of healthy nodes in the node group, a number of requests per second handled at the node, and a specified time period.

20. The non-transitory computer-accessible storage medium as recited in claim 15, wherein the connections between the client devices and the plurality of load balancers are Transmission Control Protocol (TCP) connections that carry Hypertext Transport Protocol (HTTP) messages between the client devices and the plurality of load balancers.

* * * * *